(12) United States Patent
Muskatblit et al.

(10) Patent No.: US 12,355,679 B1
(45) Date of Patent: Jul. 8, 2025

(54) PACKET SWITCHED CONTROL, CIRCUIT SWITCHED DATA APPARATUS ORCHESTRATED BY A LOW-LATENCY DIGITAL PROGRAMMABLE CONTROLLER

(71) Applicant: Morgan Stanley Services Group Inc., New York, NY (US)

(72) Inventors: Igor G. Muskatblit, Mountain View, CA (US); Michael Gorbovitski, New York, NY (US); Joshua N. Elijah, London (GB)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 18/960,449

(22) Filed: Nov. 26, 2024

Related U.S. Application Data

(60) Provisional application No. 63/616,930, filed on Jan. 2, 2024.

(51) Int. Cl.
*H04L 49/253* (2022.01)
*H04L 45/42* (2022.01)
(Continued)

(52) U.S. Cl.
CPC ............ *H04L 49/254* (2013.01); *H04L 45/42* (2013.01); *H04L 49/101* (2013.01); *H04L 49/351* (2013.01)

(58) Field of Classification Search
CPC ....... H04L 49/254; H04L 45/24; H04L 45/42; H04L 49/101; H04L 49/111; H04L 49/112; H04L 49/351; H04L 49/1515
See application file for complete search history.

(56) References Cited

U.S. PATENT DOCUMENTS 6,650,638 B1 11/2003 Walker et al.
7,949,134 B2 * 5/2011 Goergen ................. H04L 25/14
380/268
(Continued)

FOREIGN PATENT DOCUMENTS

WO 2009/017800 A2 2/2009
WO 2022/118066 A1 6/2022

OTHER PUBLICATIONS

Forencich Alex et al: "A Dynamically-Reconfigurable Burst-Mode Link Using a Nanosecond Photonic Switch", Journal of Lightwave Technology, Mar. 15, 2020, pp. 1330-1340.
(Continued)

*Primary Examiner* — Mohamed A Kamara
(74) *Attorney, Agent, or Firm* — Leason Ellis LLP (57) ABSTRACT

Data requesting devices and data sending devices are provided. Each of the devices are configured with at least one request port and at least one response port. A packet switched network device is coupled to the respective request ports of the data requesting devices and the data sending devices. Moreover, a low-latency digital programmable controller configured as a central orchestrating unit is coupled to the packet switch network device. A circuit switched network device is coupled to the central orchestrating unit and coupled to at least the respective response ports of the plurality of data requesting devices and the plurality of data sending devices, wherein the circuit switched network device is configured to receive a data request from one of the plurality of data requesting devices for data from one of the plurality of data sending devices, and send the data request to the central orchestrating unit.

18 Claims, 7 Drawing Sheets

(51) Int. Cl.
*H04L 49/101* (2022.01)
*H04L 49/351* (2022.01)

(56) References Cited

U.S. PATENT DOCUMENTS

| | | | | |
|---|---|---|---|---|
| 8,687,629 | B1* | 4/2014 | Kompella | H04L 49/1515 |
| | | | | 710/316 |
| 2010/0061391 | A1* | 3/2010 | Sindhu | H04L 49/356 |
| | | | | 370/474 |
| 2011/0176804 | A1 | 7/2011 | Biinkert et al. | |
| 2015/0181317 | A1 | 6/2015 | Yin et al. | |
| 2022/0385597 | A1* | 12/2022 | Lavon | H04L 49/254 |

OTHER PUBLICATIONS

Chen Gregory et al, "A 340mV-to-0.9V 20.2Tb/s source-synchronous hybrid packet/circuit-switched 16×16 network-on-chip in 22nm tri-gate CMOS", Digest of Technical Papers, ISSCC Feb. 11, 2014, pp. 276-278.
European Search Report for corresponding EP Application No. 25150127.6 dated May 16, 2025 (12 pages).

* cited by examiner

PACKET SWITCHED CONTROL, CIRCUIT SWITCHED DATA APPARATUS ORCHESTRATED BY A LOW-LATENCY DIGITAL PROGRAMMABLE CONTROLLER

CROSS-REFERENCE TO RELATED APPLICATIONS

This application is based on and claims priority to U.S. Provisional Patent Application No. 63/616,930, filed Jan. 2, 2024, the entire contents of which are incorporated by reference as if set forth in entirety herein.

FIELD

The present disclosure relates, generally, to data transmissions and, more particularly, to a flexible and scalable reduced latency architecture connecting requesting devices to transmitting devices.

BACKGROUND

Data center applications support moving data between requester devices and responder devices. Generally, a requester device refers to a module (e.g., a CPU or GPU or AI accelerator) seeking access to data. A responder device refers to a module that sends data, and can include a TPU or AI accelerator, a GPU, or a bank of memory (coupled with a CPU or otherwise). In operation, generally, a request for data is of a short length of data, while a responder's response is a longer length of data. Typical network computing applications require multiple requester and responder devices to be able to communicate with each other over a network. Over time, the need for additional requester/responder devices per network often increases. Unfortunately, the addition of requesting/responder devices requires increased data throughput capacity.

Typical data center applications place requester and responder devices on a packet switched network. Unfortunately, packet switched networks can be prone to congestion as the number of connected devices increases, and has per-responder data costs, which can be super-linear in the aggregate responder bandwidth. In operation, packet switching, generally, supports all devices being connected to each other simultaneously, although not all devices need to be transmitting at the same time.

Packet switched networks do not scale efficiently, as more devices/more bandwidth means more transistors dedicated to networking and, hence, more power. Further, packet switched networks cause high latency. Circuit switched systems, in contrast, while not having this drawback, require a circuit to be established which, for block-based scrambled digital protocols (64b/66b and similar (Ethernet, infiniband, etc.)), require a costly sync (upwards of 10 microseconds) on circuit establishment.

During data transmission between a sending device and a receiving device, the receiving device must "lock" on to the underlying clock that the sending device is using to send the data. Doing so enables the receiving device to sample the data, thereby enabling the receiving device to locate the delimiter between blocks of data. In Ethernet-like protocols, this delimiter can be an unscrambled two-bit sync header (either 01 or 10), which may be different in other network protocols. In any event, the concept is generally the same idea across most modern L2 protocols, as receiving devices rely on the delimiter to parse separate blocks of data correctly. Moreover, receiving devices must synchronize its scrambler state with the scrambler state of the sending devices to descramble data correctly. Unfortunately, these steps take time which, in the case of an Ethernet-like protocols network, can be upwards of 10 microseconds and can occur during each circuit switch event. This would be an unacceptable delay and negates other performance benefits.

It is with respect to these and other considerations that the disclosure made herein is presented.

BRIEF SUMMARY

In one or more implementations, a data apparatus and method are disclosed and orchestrated by a low-latency digital programmable controller. In one or more implementations, a plurality of data requesting devices and a plurality of data sending devices are provided, in which each of the data requesting devices and data sending devices configured with at least one request port and at least one response port. Further, a packet switched network device is coupled to at least the respective request ports of the plurality of data requesting devices and the plurality of data sending devices. Moreover, a low-latency digital programmable controller configured as a central orchestrating unit is coupled to the packet switch network device. A circuit switched network device is coupled to the central orchestrating unit and coupled to at least the respective response ports of the plurality of data requesting devices and the plurality of data sending devices, wherein the circuit switched network device is configured to receive a data request from one of the plurality of data requesting devices for data from one of the plurality of data sending devices, and send the data request to the central orchestrating unit. Further, the central orchestrating unit is configured to receive the data request from the packet switched network and process the data request by dynamically reconfiguring the circuit switched network fabric to create a physical connection between the one of the plurality of data requesting devices and the one of the plurality of data sending devices.

In one or more implementations of the present disclosure, the central orchestrating unit is an ultra-low latency field programmable gate array or an application-specific integrated circuit.

In one or more implementations of the present disclosure, the packet switched network is an Ethernet switch.

In one or more implementations of the present disclosure, the data apparatus includes a request plane managed by the central orchestrating unit and a data response plane.

In one or more implementations of the present disclosure, the circuit switched network fabric is reconfigured based on predetermined configuration information representing the circuit switched network.

In one or more implementations of the present disclosure, the one of the plurality of data requesting devices for data from one of the plurality of data sending devices are mesosynchronized prior to the one of the plurality of data sending devices transmitting data to the one of the plurality of data requesting devices.

In one or more implementations of the present disclosure, the one of the plurality of data sending devices transmits a pattern of data with the requested data, and further wherein the pattern of data is known by the one of the plurality of data requesting devices in advance, and further wherein the one of the plurality of data requesting devices uses the pattern of data to identify a delimiter in the transmitted data.

In one or more implementations of the present disclosure, the data transmitted by the one of the plurality of data sending devices is scrambled, and further wherein the one of the plurality of data requesting devices knows a scrambler state of the one of the plurality of data sending devices and a scrambler type, and further wherein the one of the plurality of data requesting devices uses the scrambler state and the scrambler type to descramble the data.

In one or more implementations of the present disclosure, at least one other low-latency digital programmable controller configured as at least one second central orchestrating unit coupled to the packet switch network device.

BRIEF DESCRIPTION OF THE DRAWINGS

Aspects of the present disclosure will be more readily appreciated upon review of the detailed description of its various embodiments, described below, when taken in conjunction with the accompanying drawings, of which.

DETAILED DESCRIPTION

Figure 1:
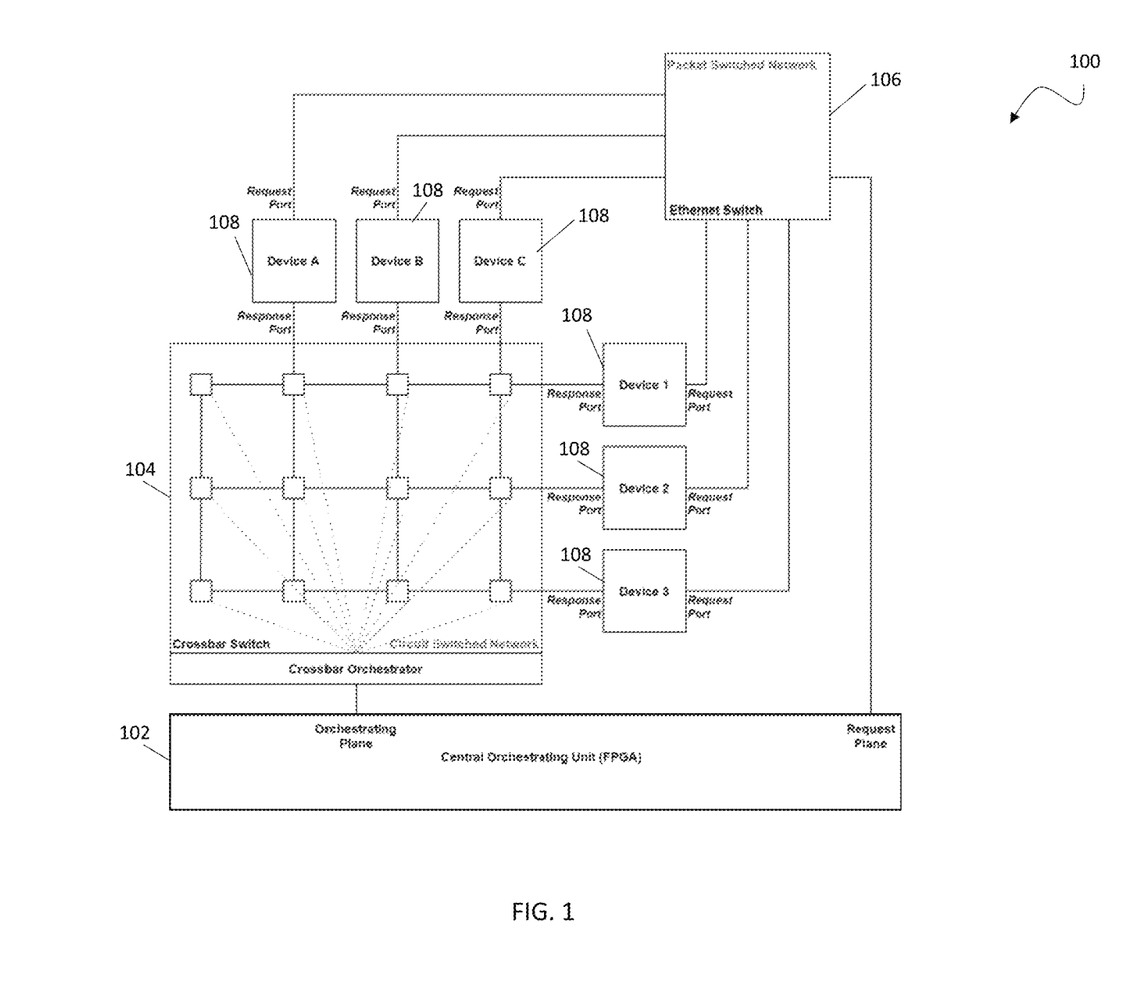
FIG. 1 shows an example system architecture, in accordance with an example implementation of the present disclosure.

The present disclosure provides systems and methods for packet switched control, including a circuit switched data apparatus orchestrated by a low-latency digital programmable controller core. Referring now to FIG. 1, an example programmable architecture 100 is shown, in accordance with an example implementation of the present disclosure. In the example shown in FIG. 1, a central orchestrating unit 102 is electrically coupled to a circuit switched network 104 and a packet switched network 106. In the implementation shown in FIG. 1, the central orchestrating unit 102 is an ultra-low latency field programmable gate array ("FPGA"). In one or more implementations of the present disclosure, central orchestrating unit 102 can be an application-specific integrated circuit ("ASIC"). As shown in FIG. 1, architecture 100 includes a request plane (managed by the central orchestrating unit 102) which is low latency but low bandwidth) and a data response plane (which is low latency and high bandwidth). Also, in the implementation shown in FIG. 1, the circuit switched network 104 is configured as a crossbar switch and the packet switched network 106 is configured as an Ethernet-like protocols layer 1.5 switch. More particularly, the orchestrating plane of the central orchestrating unit 102 is coupled to a crossbar orchestrator of the crossbar switch.

Continuing with reference to FIG. 1, a plurality of requesting/responding devices 108 (Device A, Device B, Device C, and Device 1, Device 2, Device 3) are shown, each of which is coupled to the circuit switched network 104 and packet switched network 106. More particularly, a request port each of the devices 108 is coupled to the packet switched network 106 and a response port coupled to the circuit switched network 104. Each device 108 has one or more ports dedicated to sending and receiving data which is high bandwidth, low latency, large data (response port). One or more ports is dedicated to sending and receiving control data which is low bandwidth, ultra-low latency, small data (request port).

In operation, the programmable architecture 100 can, as a function of the central orchestrating unit 102, dynamically reconfigure the circuit switched network 104 fabric to create physical connections between two of the devices 108. The central orchestrating unit 102 can be a programmable sub-10 nanosecond circuit (e.g., a FPGA), and be connected to the packet switched network 106 (e.g., operating as a control fabric) to receive all requests sent to the packet switched network 106. The central orchestrating unit 102 can communicate with the request ports of all devices. The devices 108 cannot see the ports of other devices 108 through the packet switch. The central orchestrating unit 102 can configure the mapping of the crossbar fabric programmatically, for example, in under 50 nanoseconds. Once connected, data can move between two devices 108 (e.g., Device A and Device 1) through the crossbar switch via the connection point(s) established dynamically by the central orchestrating unit 102.

In one or more implementations of the present disclosure, the central orchestrating unit 102 (e.g., the FPGA) is configured with information representing the topology of circuit switched network 104 (e.g., of the crossbar). In response to receiving a connection request via the packet switched network 106 the central orchestrating unit 102 effectively programs the circuit switched network 104 to establish a data connection between one device 108 (e.g., Device A) and another device 108 (e.g., Device 1). In short, a request goes out via packet switched network 106 and the central orchestrating unit 102 creates the new connection over the circuit switched network 104. One of ordinary skill will appreciate the expandability and scalability of the architecture 100 and the improved efficiency of orchestrating connectivity in terms of conflicts and errors, as well as by dynamic reconfiguring connections as each of a plurality of devices 108 communicate. The present disclosure overcomes limitations of a static physical connections set in a switch, as well as requirements for more sophisticated computing capability in the circuit switched network 104 (e.g., beyond that of a simple crossbar). The present disclosure effectively uses computing capability of the central orchestrating unit 102 to support substituting an electrical crossbar to an optical crossbar and to scale up the number of devices 108 that can be interconnected. Unlike known systems, the present disclosure supports coding the connection in sub-microsecond timescales. This can be accomplished by moving the request for data connectivity from the requesting device 108 via the packet switched network 106 and simultaneously reconfiguring the circuits in the circuit switched network to transfer the data between the devices 108. The result is improved performance from milliseconds (or more) to nanoseconds, resulting in improvement in about six orders of magnitude. Although packet switched networks can operate with very low latency, they have low bandwidth limitations when doing so. In operation, for example, a packet switched network might start and finish transmitting data in 30 nanoseconds, but cannot move 400 gigabits of data per second. Accordingly, the present disclosure supports a separation between the data transmissions over the data plane and the requests over the orchestrating plane.

Figure 2:
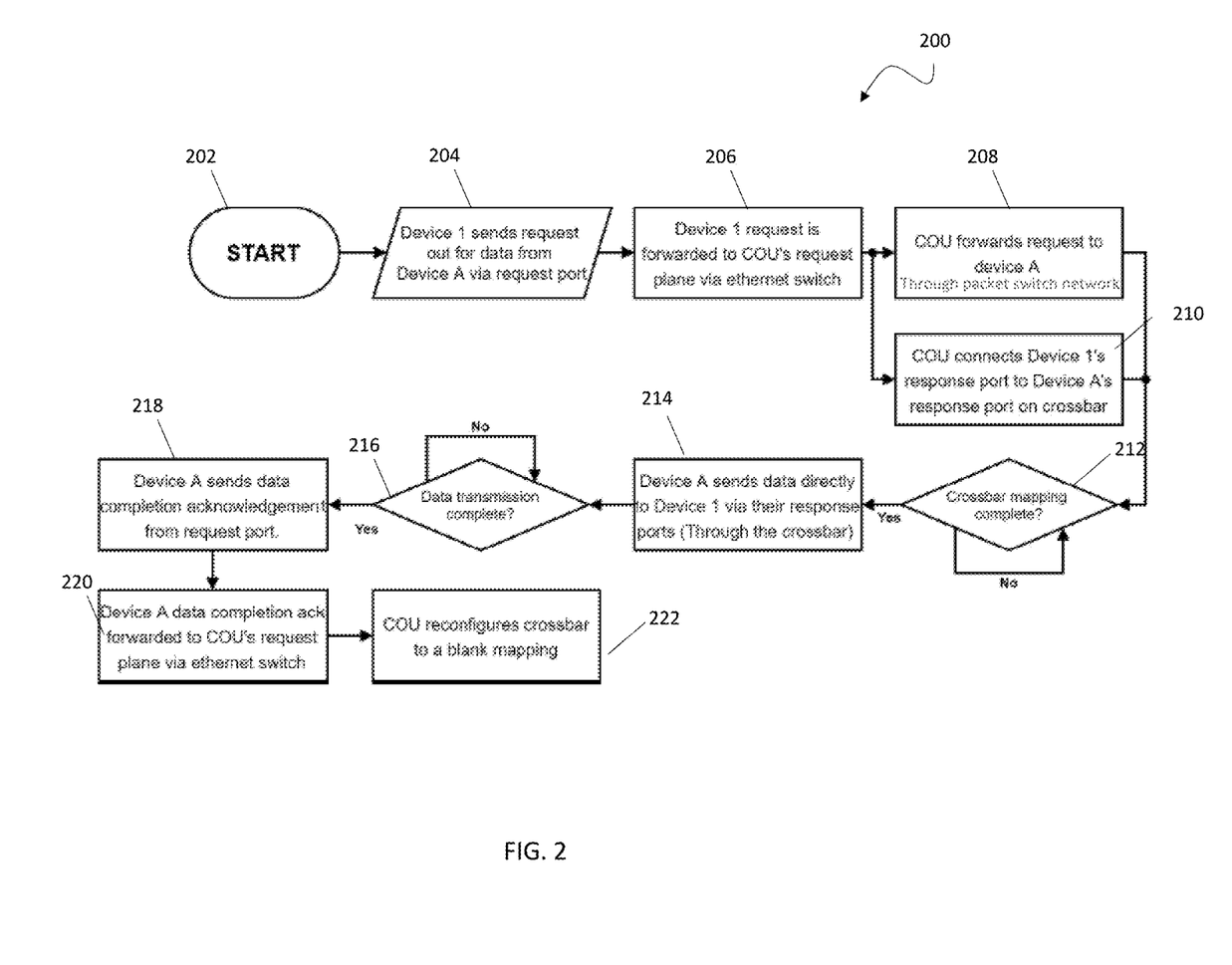
FIG. 2 shows a flowchart illustrating an example process flow, in accordance with an example implementation of the present disclosure.

FIG. 2 illustrates a flowchart illustrating steps executed in a programmable architecture 100 for data transmission in accordance with an example implementation of the present disclosure. At step 202, the process starts and, thereafter, a device 108 ("Device 1") sends a request for data from another device 108 ("Device A") via the request port (step 204). Thereafter, the Device 1 request is forwarded to the central orchestrating unit 102 via the packet switched network 106 (step 206). The central orchestrating unit 102 forwards the request to Device A (step 208) as a function of connecting Device 1's response port to Device A's response port on the circuit switched network 104 (step 210). For example, the central orchestrating unit 102 forwards this request to the responding device though the packet switched network 106. At step 212, a determination is made whether the circuit switched network 104 mapping is complete. If not, the process loops until the mapping is complete.

The central orchestrating unit 102 (e.g., the FPGA) and the crossbar switch can be deterministic, and thus once the central orchestrating unit 102 receives a request from the packet switched network, a fixed time amount between receiving that request and completion of remapping the switch can be calculated. Thereafter, a simple fixed time delay can be implemented on all devices. Unfortunately, however, either of the requesting or responding device may not determine the exact time the central orchestrating unit 102 receives the request. Moreover, remapping time may not be always be deterministic, as mapping physically disparate channels can take longer than channels that are more closely located, and clock skew can cause a delays that increment in multiples of the clock period (a slightly delayed clock edge will violate the setup and hold time of an incoming signal, thus causing the signal to not be latched until the next clock edge). Accordingly, the simple fixed time approach may not be feasible in specific implementations.

Accordingly, and as noted herein, the present disclosure provides an improved methodology, by utilizing a connection between the requesting and responding devices 108. More particularly, after a connection is made, initial sync/pattern matching can be performed, in which a responding device 108 sends the initial known pattern, and the requesting device 108 returns the same pattern back. Once the responding device 108 sees on the receiving side of its response port the same pattern previously sent, a connection is known to have been established. One of ordinary skill will recognize that an ethernet port can include a device configured with an RX and a TX pair. Accordingly, each response port connected to the circuit switched network 104 (e.g., crossbar switch) includes an RX and TX. Therefore, in operation, a TX side of a response port on Device A connects to the RX side of a response port on Device 1.

If the determination in step 212 is affirmative, then the process branches to step 214 and Device A transmits data to Device 1 via the devices' respective response ports through the circuit switched network 104. Thereafter, at step 216 a determination is made whether the data transmission is complete. If not, the process loops until the transmission is complete. If the determination at step 216 is affirmative, then the process branches to step 218, and Device A transmits a data completion acknowledgment from its respective response port. Thereafter, the process continues to step 220, and Device A transmits a completion acknowledgment which is forwarded to circuit switched network 104 request plane via the packet switched network 106. Thereafter, the central orchestrating unit 102 reconfigures resources on the circuit switched network 104 to a blank mapping. Features and details of steps associated with FIG. 2 are described in greater detail, below.

It is recognized herein that, notwithstanding the performance benefits of separating the request and the data layer to establish a connection between two devices 108 (e.g., Device A and Device 1, as shown and described herein, simply connecting the two devices 108 typically does not result in successful data transfer and reception. The devices 108 require information, such as a particular frequency that a signal is operating at and encoding information.

In operation, the clock signal is expected to be the same for devices on the network. In case of a 10G ethernet network, for example, the line clock signal (e.g., the underlying clock signal for data transmission) would be 10.3125 GHz. At least some of the devices communicating on the network can transfer over the 10.3125 GHz signal by generating a slower (e.g., 156.25 MHz) signal, and then use a phase lock loop to generate the 10.3125 GHz signal from the slower signal. For example, taking into account 66 bits per frame, 156.25 Mhz×66=10.3125 GHz. Thus, the clock signal frequency of each frame can be 156.25 MHz, while the clock frequency of each bit can be 10.3125 Ghz.

It is recognized herein that, while all devices can be configured with a clock signal frequency of 10.3125 GHz, different devices can use respective onboard reference clocks for generating the faster signal. Accordingly, while all devices can nominally run at 10.3125 GHz, small differences in the tolerances between the signals, for example, due to the respective onboard reference clocks, can result in data integrity issues.

In at least a typical 10GBASE-KR ethernet connection, the present disclosure solves such data integrity issues. In one or more implementations, a transmitting device sends data to a receiving device (RX) and, following receipt, the receiving device extracts the clock signal from the data received from the TX. Once extracted, the RX can use the clock signal of the TX to generate the faster transmission signal. Thus, for example, a single ethernet connection having two connected devices, including TX and RX on one device and a RX and TX on the other device, there can be two clock domains used for generating the faster signal. Of course, one of ordinary skill will recognize other design implementations for addressing the data integrity concern described above. For example, in one or more implementations of the present disclosure, one device can generate a faster signal for outgoing data using the clock signal extracted from a received signal, in order to "clock" the outgoing data. This approach can reduce all devices to a single clock domain, resulting in more convenient handling. Such instances can depend on a specific Ethernet implementation. For example, one device can be designated as a clock master, and the clock signal used for that device's TX data can be used as the RX and TX clock in the receiving device. In an alternative implementation, another external device can provide a clock reference to both of the connected devices (e.g., one device TX and RX, and one device RX and TX). While appearing as an elegant solution to improving data integrity, the latter implementation can be difficult to scale as many devices send and receive data. For example, longer wires required for the clock signal cause clock delays and clock skews that end up causing the clock to "look" different at different parts of the circuit. Accordingly, the present disclosure provides improved mechanisms connectivity and data transfer.

In an example operation, the central orchestrating unit 102 sends a request to the request port of a data sending device 108, requesting it to send data on its response port. The sending device 108 transmits a known preamble prefixing its data send, e.g., scrambled/gearboxed or otherwise, which is used to lock in the state of the scrambler on the requesting device 108. The length of the preamble can be pre-known and sufficient to recover the scrambler state, presuming the phase lock loops ("PLLs") are synchronized and do not require a full resync, which is the expected condition as the PLLs are kept meso-synchronized and within adjustment. Once the sending device 108 has completed sending the data on its response port, the requesting device 108 sends an acknowledgement on its request port, thereby informing the central orchestrating unit 102 that the data transmission is complete. In the event that the requesting device 108 loses either PLL or scrambler sync, the requesting device 108 notifies the central orchestrating unit 102 that its transmission is complete, and internally waits until it can reestablish a PLL lock. Thereafter, the requesting device 108 can, as necessary, resubmit its request for data (looping back to step 204, FIG. 2). Thereafter, the central orchestrating unit 102 is free to remap any resources consumed by the circuit to any state.

Accordingly, in one or more implementations of the present disclosure, each device 108 has at least two ports. One or more of the ports can be dedicated to sending and receiving data which can be high bandwidth, low latency, high power, large data (response port). One or more of the ports can be dedicated to sending and receiving control data which is low bandwidth, ultra-low latency, small data (request port). Response ports of all devices 108 are connected into a crossbar switch fabric (e.g., a circuit switched network 104), and request ports of all devices 108 are connected into an Ethernet-like protocol switch fabric (i.e., packet switched network 106).

In accordance with the present disclosure, the central orchestrating unit 102 dynamically reconfigures the circuit-switched fabric via a programmable sub-10 nanosecond circuit (e.g., a FPGA). The central orchestrating unit 102 is connected to the packet switched network 106 (control fabric) and receives all requests sent into the control fabric. The central orchestrating unit 102 can communicate with the request ports of all devices, and the devices cannot see the ports of other devices through the packet switch. In operation, the central orchestrating unit 102 can configure the mapping of the crossbar fabric programmatically, such as in under 50 nanoseconds.

Once a circuit is established, a lock is established, including for a phase-locked loop ("PLL") and a scrambled state. In operation, PLLs across the data plane are meso-synchronized via either continual known patterns transmitted when a requesting device 108 is not receiving data, and is, thus, connected on the circuit crossbar to a clock source, or via a separate clock source distribution mechanism. For example, a circuit switch fabric can be impregnated with a known pattern, such that devices connected to the circuit switch fabric can be fed a consistent signal, thereby enabling the devices to lock on to the same clock signal. This avoids a need to lock in a PLL from a cold state on a circuit establishment, which can take much more than 1 microsecond. In operation, the requesting device 108 may correctly establish the phase by testing a small number of phases. The scramblers do not have to be synchronized, as they can achieve fast sync by having each responder send a known pattern that will, on reception, be locked onto within 1 to 16 bytes-depending on the size of the network and particular protocol.

With regard to unlock and lock latency, the present disclosure ensures receiving devices 108 "lock" on to the underlying clock that the sending device 108 is using to send the data. The receiving device 108 requires this to be able to sample the data. Moreover, the receiving device 108 locates a delimiter between two or more blocks of data. In the case of Ethernet-like protocols, the delimiter can be an unscrambled two-bit sync header (either 01 or 10). One of ordinary skill will recognize that other network protocols may use different delimiters, but the concept is shared across the vast majority of modern L2 protocols. The receiving device 108 uses the delimiter to parse separate blocks of data correctly. Furthermore, the receiving device 108 synchronizes its scrambler state with the scrambler state of the sending device 108, which is used to correctly descramble the data.

It is recognized herein that these steps take time and, in a typical Ethernet-like protocols network, may require ten or more microseconds to complete. Such delays would occur during each circuit switch event, which is unacceptable by negating any performance benefits of this architecture 100 shown and described herein.

Accordingly, the present disclosure addresses and resolves latency resulting from unlock and lock operations. One simple solution is to ensure all devices 108 are provided the same clock. This can be done, for example, by transmitting a synchronous signal to all devices 108 on the circuit switched network 104 while the devices 108 are not actively communicating with each other. Effectively, a synchronous signal feed provides all devices on the crossbar with an opportunity to maintain their respective PLLs in sync with each other. In an alternative implementation, a separate connection set can be used as a clock tree to distribute a shared clock. Either option ensures all devices 108 run from the same clock and, thus, the PLL locking time can be limited to 10-20 cycles (900-1800 ps for 10GBASE-KR, or less for higher speed protocols).

In addition to synchronizing PLLs, the present disclosure addresses the time-consuming process of locating block delimiters, which are typically indistinguishable from standard data bits in a raw stream of data. The present disclosure overcomes known delays for detecting a delimiter typically resulting from searching multiple data packets for a header packet that is consistent across multiple packets. Instead, the present disclosure uses a form of pattern matching, in which the sending device 108 appends a short, known pattern to whatever data it is otherwise transmitting, and the receiving device 108 simply locates the known pattern and uses that to identify the delimiter.

It is recognized herein that data are typically not transmitted in raw format, but rather are usually scrambled. In such instances, appending a known pattern to data being transmitted may not be effective. It is further recognized that most scrambling methods are based on a Linear Feedback Shift Register, having an initial state. Once scrambled data are received, the scrambler type is known, as well as the scrambler's initial state, the data can be descrambled easily and the scrambling process is reversible.

Accordingly, the present disclosure further includes defining, for each sending device 108, a specific scrambler state that is shared with the receiving device 108 in advance of data transmission. For example, in one or more implementations a data table can be shared with devices at the start of a transmission. Referencing the table enables each device to identify an initial scrambler state of each other device. Alternatively, a single initial scrambler state can be shared and known to all devices.

The receiving device 108 knows the sending device 108, and the receiving device 108 is synchronized (synchronous) with the sending device 108. Further, the receiving device 108 knows the initial scrambler initial state of the sending device 108 and knows the initial pattern the sending device 108 is sending with the data. These enable the receiving device to avoid time-consuming block sync process in favor of a much faster pattern match process.

Therefore, and as shown and described herein, the present disclosure provides an improved packet switched control, circuit switched data apparatus orchestrated by a low-latency digital programmable controller. The architecture shown and described herein supports improved flexibility and performance, including by supporting a crossbar switch that can be electrical or optical, for which optical is more scalable due to lower power with increased channel count. Further, while many of the implementations and examples shown and described herein regard a single central orchestrating unit 102, the present disclosure is not so limited and can support multiple central orchestrating units 102 which together can form a tree of central orchestrating units 102, which is similar to a switching network, either connected by a layer 1 or similar switches, or straight up by using several ports on each central orchestrating unit 102 as an uplink. Moreover, routing algorithms can be used between a plurality of central orchestrating units 102, such as standard industry packet routing algorithms, including packet header based dynamic switching (such as Ethernet-like protocols) or prefix-based fixed switching such as infiniband.

Further and as shown and described herein, devices 108 are mesosynchronous, in which once a circuit is created, the devices 108 need to sync up within several nanoseconds. This can be accomplished by precluding a need for a full PLL/scrambler state recovery. Instead, a lock can be established on the most recently connected circuit. In one or more implementations, remapping of a circuit switched network 104 can be blocked in response to possible new requests based on respective data transmissions.

As noted herein, at the start of a connection devices can be synchronized to the same clock, when connected together in the circuit switched network 104 (e.g., crossbar switch). In operation, this can occur at the start of a connection and one device extracts the clock from the data sent from the other device and, thereafter, uses that clock going forward. Overcoming the time-consuming nature of this approach is overcome by configuring all response ports connected to the circuit switched network 104 crossbar to mesosynchronous. The present disclosure introduces two solutions to such time problem: all devices can be connected directly to some external clock reference; or device response ports can be fed directly with the same clock via the circuit switched network 104 (e.g., crossbar switch). In one or more implementations, the latter approach is preferred, as the crossbar switch is effectively "impregnated" with a clock signal from the central orchestrating unit 102. This clock provides the fundamental clock signal of the intended data protocol. For example, in case of 10GBASE-R, the clock signal frequency is 10.3125 GHz.

Figure 3:
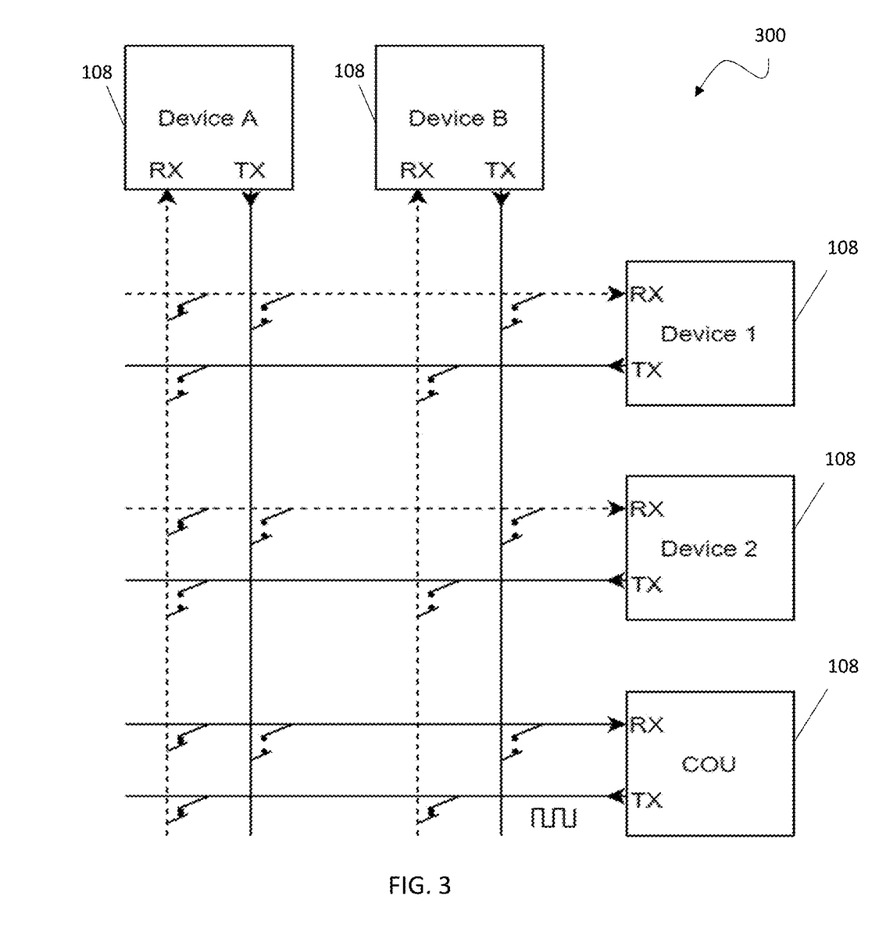
FIG. 3 illustrates a simplified representation of a switch, in accordance with an example implementation of the present disclosure.

In one or more implementations, the default (blank) mapping of the circuit switched network 104 (e.g., crossbar switch) has all of the RX-side of response ports for devices 108 connected to the clock signal from the central orchestrating unit 102. FIG. 3 illustrates an example configuration of the circuit switched network 104 (e.g., crossbar switch) for such connectivity. As illustrated in FIG. 3, dotted lines represent lines that carry the clock from the central orchestrating unit 102. As used herein, this clock can be referred, generally, as the "COU sync clock."

It is recognized herein that on occasion two devices 108 will need to connect together, which can result in a disconnection of the clock sync, thereby causing a loss of lock between those two devices. The present disclosure addresses this issue by defining a first type of data the responding device transmits over its TX channel as a training sequence of 1 s and 0 s. The training sequence can be generated in a clock domain of the COU sync clock, received on the RX channel. This operation is exactly the same as the clock itself. In such case, the training sequence will be mesosynchronous to the COU sync clock. Put another way, it will be the same frequency, but may not be the same phase as the COU sync clock.

Figure 4:
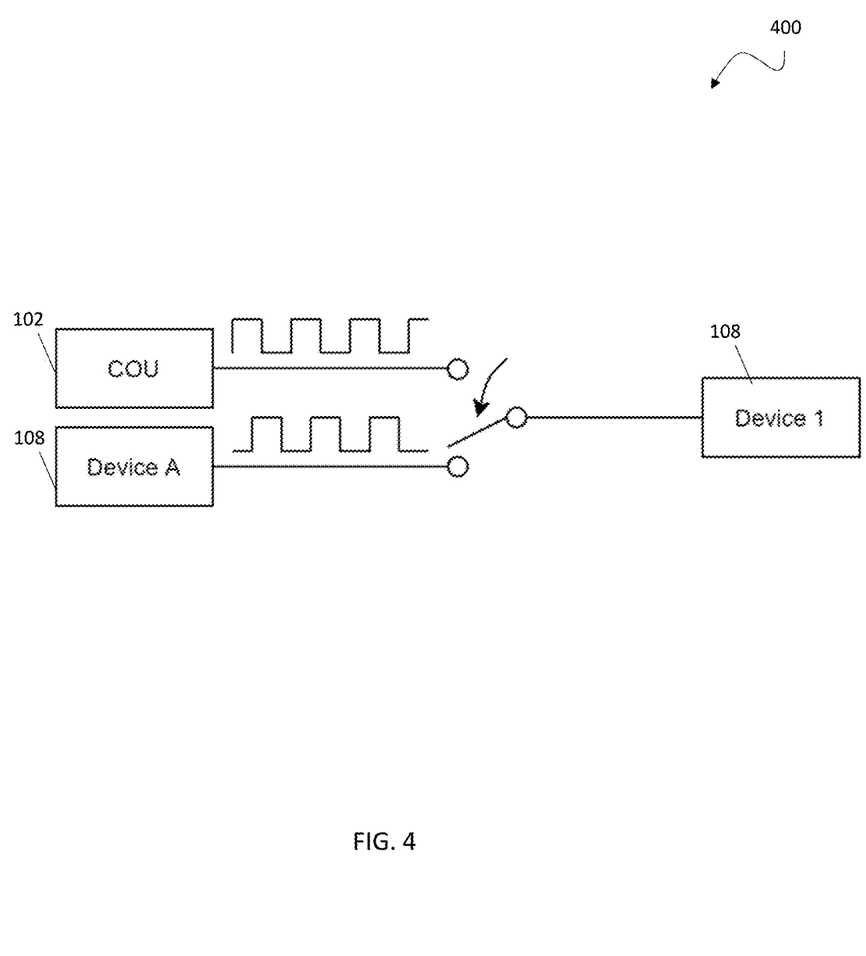
FIG. 4 illustrates an example switchover event between two devices, in accordance with an example implementation of the present disclosure.
Figure 5:
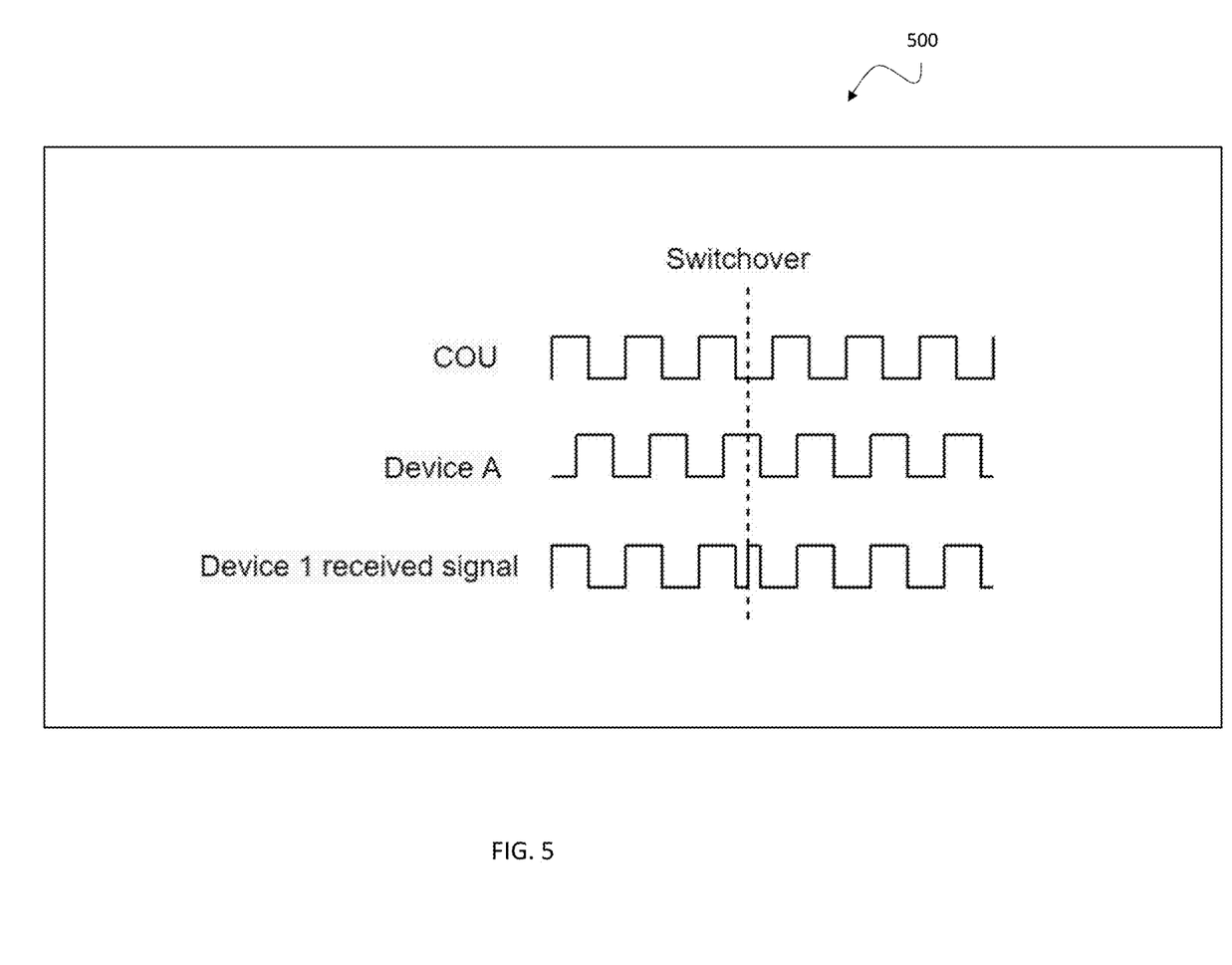
FIG. 5 illustrates an example glitch resulting from a switching from one device to another, in which the clock phase is different.

The present disclosure addresses a concern that the switchover described above is hitless, that is the switch from the COU sync clock to the training sequence TX channel does not create any glitches or delays. It is recognized herein that some interruption at the very instant of switchover is conceivable, for example, due to the clocks being out of phase. Such glitch or interruption is likely to be of little consequence, since the PLL of the receiver is already synchronized with COU sync clock, including for having the same frequency as the training sequence, and the PLL will be minimally affected. FIG. 4 illustrates an example switchover event between two devices, in accordance with an example implementation of the present disclosure. Further, FIG. 5 illustrates an example glitch resulting from a switching from one device to another, in which the clock phase is different.

Figure 6:
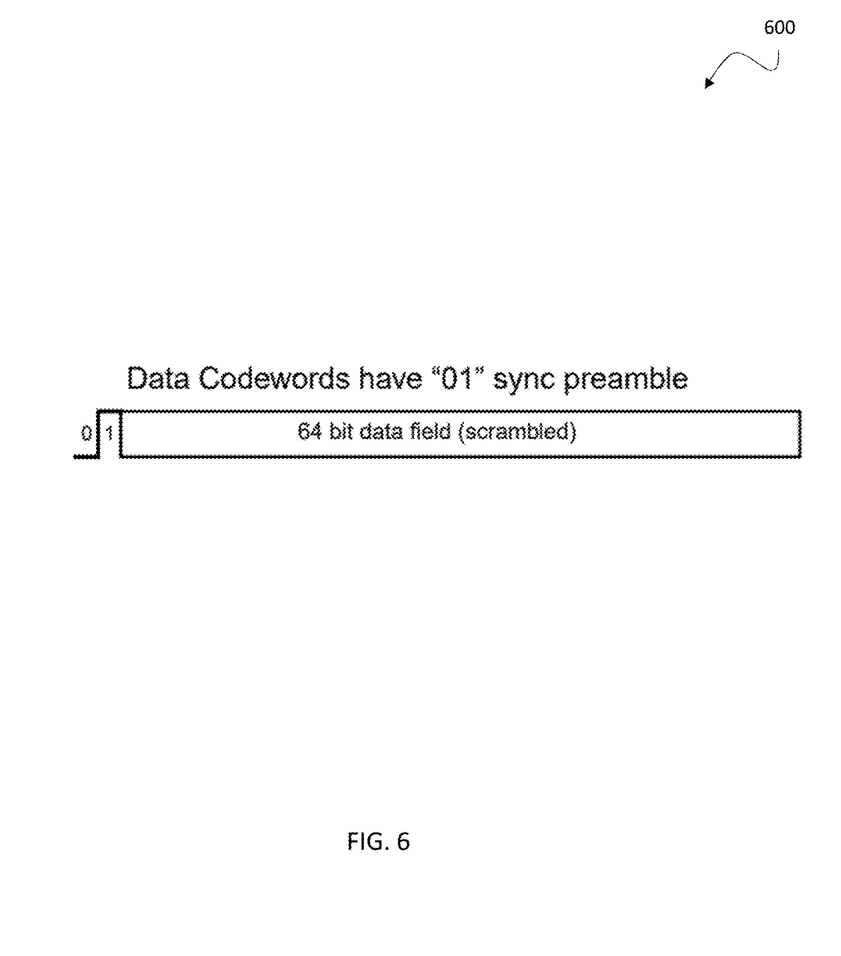
FIG. 6 shows a pictorial representation of 64/66b encoding, in accordance with an example implementation of the present disclosure.

As noted herein, the present disclosure provides for receiving devices 108 to locate a delimiter between two or more blocks of data. In one or more implementations of the present disclosure, 10GBASE-R ethernet using 64/66b encoding is provided. As known in the art, 64/66b encoding includes sending data in 66-bit frames, in which each frame includes two sync header bits and 64 scrambled data bits. The 2 sync header bits are defined as either a 0 1, or a 1 0. In other words, the sync header bits include a bit transition (rising edge or falling edge), but sync header bits do not support values of 1 1 or 0 0, which is in contrast to the 64 scrambled data bits. The 64 scrambled data bits can appear random, though one of ordinary skill will recognize that such scrambling is not a random process and that a linear feedback shift register or other feature can be used to create pseudo random data. FIG. 6 shows a pictorial representation of 64/66b encoding, in accordance with an example implementation of the present disclosure. While the example implementation shown and described herein regard 10GBASE-R ethernet, it is to be appreciated that other encoding styles are supported by the present disclosure, such as 8/10b, as the logic principles are applicable.

Continuing with the example shown in FIG. 6, a 66-bit frame can include a position for a bit transition, and the remaining positions include data appearing randomized. For example, one hundred 66-bit frames can be lined up, based on the position for the bit transition, which enables the ability to "delimit" and tell the boundaries between each 66-bit block and, thus, know determine where to extract the respective 64 bits of data.

The process of locating boundaries between each block is referred to herein, generally, as block sync, which occurs once at the start of an Ethernet connection. One of ordinary skill will recognize there are various block sync options. For one, a FPGA transceiver implements a process of randomly selecting two adjacent bits in a stream, followed by confirming a transition over multiple frames. In the event that no transition is detected, the FPGA "shifts" forward by one bit and checks the next two adjacent bits. The FPGA repeats this process until two adjacent bits are detected where there is always a transition. Then, the FPGA can identify (e.g., for the rest of the transceiver) the location of the delimiter.

Unfortunately, the block sync process can be time-consuming. For example, false negatives can be detected, where the process locks onto scrambled bit positions for a while until a non-transition is found in that bit position and moves on to the next position. This time cost is usually not a problem since it's only incurred at the start of a connection, and in normal networks, connections are not disconnected and reconnected often. Implementations of the present disclosure, regard network connectivity involving devices that frequently connect and disconnect. The features shown and described herein accelerate that process and, more particularly, the process of block sync, by transmitting a specific pattern that block sync lock identifies quickly.

In one example, the specific pattern is a 66-bit block with a sync header, in which the 64 payload (data) bits consists only 0's or all 1's. This can be construed, effectively, as a frame consisting solely of a sync header. With such a pattern, even where a block sync circuit selects the bit position just after the sync header, only one clock cycle would be on each remaining bit until the sync header is located. From this point on, the transceiver has a lock on the delimiter and data can be sent as normal. It is to be appreciated in this example that, in such case, a response device sends at least 66 copies of the "sync header only" frame. At 10GBASE-R speeds, each bit is 96.96 ps. Accordingly, sending a frame of 66 bits is 6.399 ns and sending 66 such frames is 422357 ps (422.4 ns).

In one or more implementations, the present disclosure can improve on this performance. For example, a known pattern can be designed that a responder sends initially, after the initial clock, which can be provided on a destination-by-destination basis, or globally. In any event, the known pattern is preferably pre-defined and shared among all devices. A respective receiving device can run a simple pattern match to check when this pattern is received and, thereafter, lock onto the last bit of this pattern as the delimiter. Supporting an implementation in this way can include the block sync circuit inside the transceiver to be modified to recognize the known pattern. However, use of a simple 66-bit pattern in this way can further reduce the lock time, for example, from 422.4 ns down to 6.4 ns. Furthermore, the result is backwards compatible with existing transceivers (e.g., while working as receivers) and, thus no change to the Ethernet protocol is required. Furthermore, in one or more implementations of the present disclosure, the training sequence can be a valid sequence. In such case the transceiver can lock on, for example, after 66 frames, regardless, and receivers run from a clock, and also knowing where the fixed delimiters are between each packet more quickly once a circuit is established.

One of ordinary skill will recognize that after an Ethernet connection is made between two devices, some time may be required for the scrambler states (e.g., via linear feedback shift registers) to match up, thereby enabling data to be descrambled. During synchronization, such as for a scrambler linear feedback shift register on the transmitting side and a descrambler linear feedback shift register on the receiving side, scrambled data from the scrambling linear feedback shift register is sent until all the stored bits are overwritten. This process is relatively fast, as linear feedback shift registers typically do not store many bits, but does take some time over many instances can be costly. The present disclosure overcomes this problem with a solution that defines all nodes in the circuit switched network to have the same scrambler state at the instant of connection. One of ordinary skill will recognize that scrambling is not used for purposes of security, and so long as all devices agree ahead of time to use a known specific scrambler state, and load/reload their respective scramblers at the instant a connection is made, security is not compromised and speed is improved. Orchestrating the sharing of a scrambler state can be done once at the start via the packet switched network and, as will be appreciate by one of ordinary skill, is not overly complicated to achieve. This option obviates a need for a scrambler sync, thereby saving time, such as 5.7 ns.

Figure 7:
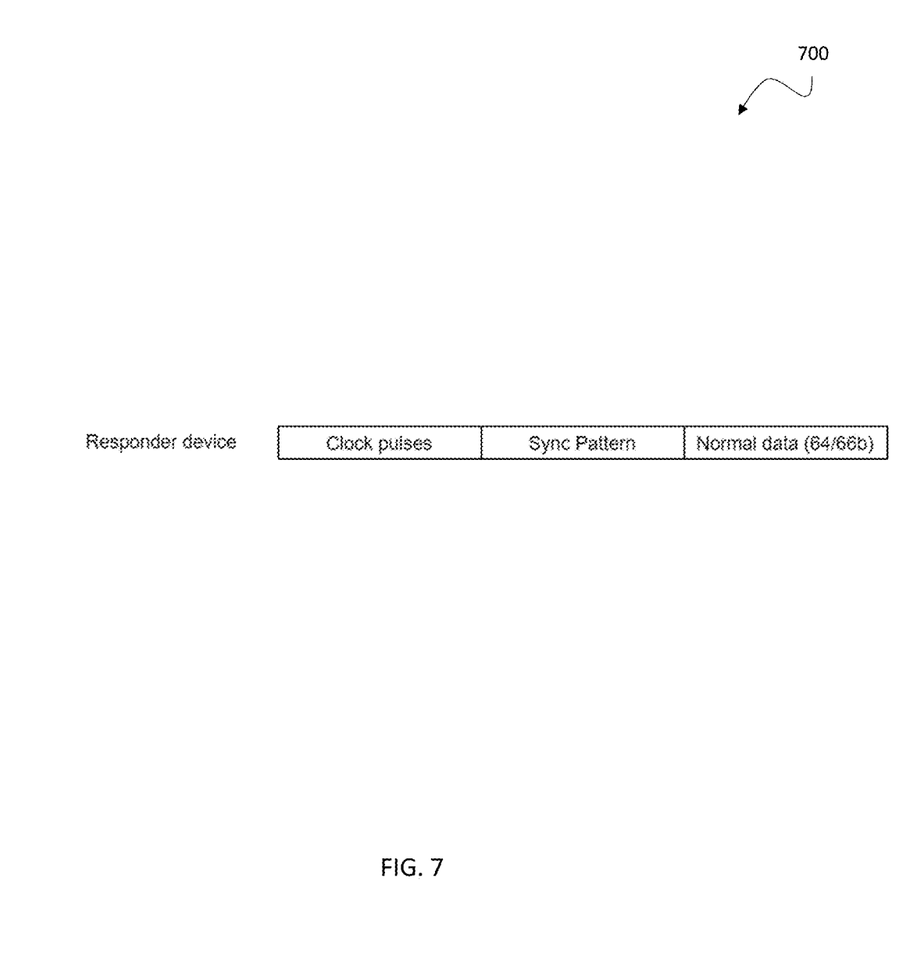
FIG. 7 is a simple diagram illustrating transmitted data when a connection is made on the circuit switch network.

FIG. 7 is a simple diagram illustrating transmitted data when a connection is made on the circuit switch network 104. The access time set forth in accordance with the present disclosure is significantly improved. The typical access time for DRAM is on the order of 100 cycles, easily more than 40 ns. This means that within a single rack device, it can take a CPU a while to access data from a DRAM. Implementations of the present disclosure support one rack device accessing another rack device within a similar time period. This represents a significant improvement.

Moreover, the present disclosure addresses possible tradeoffs between one-to-one blocking as opposed to the central orchestrating unit 102 stack up requests in advance of parallel mapping. In practice, parallel mapping can allow multiple devices to use the central orchestrating unit 102, but can require the central orchestrating unit 102 to delay processing until a sufficient number of data transmission requests are received. The present disclosure solves this by employing a crossbar for a circuit switched network 104 that can be configured on a per channel basis.

Any of the features shown described herein may, in corresponding implementations, be reduced to a non-transitory computer readable medium (CRM, such as a disk drive or flash drive) having computer instructions stored therein that, when executed by a processing circuit, cause the processing circuit to carry out an automated process for performing the respective methods.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It is further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Any terms of orientation are used herein merely for purposes of convention and referencing and are not to be construed as limiting. However, it is recognized these terms could be used with reference to a viewer. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A data apparatus orchestrated by a low-latency digital programmable controller, the apparatus comprising:
    a plurality of data requesting devices and a plurality of data sending devices, each of the data requesting devices and data sending devices configured with at least one request port and at least one response port;
    a packet switched network device, coupled to at least the respective request ports of the plurality of data requesting devices and the plurality of data sending devices;
    a low-latency digital programmable controller configured as a central orchestrating unit coupled to the packet switch network device; and
    a circuit switched network device coupled to the central orchestrating unit and coupled to at least the respective response ports of the plurality of data requesting devices and the plurality of data sending devices,
    wherein the circuit switched network device is configured to:
        receive a data request from one of the plurality of data requesting devices for data from one of the plurality of data sending devices; and
        send the data request to the central orchestrating unit, and
    further wherein the central orchestrating unit is configured to:
        receive the data request from the packet switched network; and
        process the data request by dynamically reconfiguring the circuit switched network fabric to create a physical connection between the one of the plurality of data requesting devices and the one of the plurality of data sending devices.

2. The apparatus of claim 1, wherein the central orchestrating unit is an ultra-low latency field programmable gate array or an application-specific integrated circuit.

3. The apparatus of claim 1, wherein the packet switched network is an Ethernet switch.

4. The apparatus of claim 1, wherein the data apparatus includes a request plane managed by the central orchestrating unit and a data response plane.

5. The apparatus of claim 1, wherein the circuit switched network fabric is reconfigured based on predetermined configuration information representing the circuit switched network.

6. The apparatus of claim 1, wherein the one of the plurality of data requesting devices for data from one of the plurality of data sending devices are mesosynchronized prior to the one of the plurality of data sending devices transmitting data to the one of the plurality of data requesting devices.

7. The apparatus of claim 1, wherein the one of the plurality of data sending devices transmits a pattern of data with the requested data, and further wherein the pattern of data is known by the one of the plurality of data requesting devices in advance, and further wherein the one of the plurality of data requesting devices uses the pattern of data to identify a delimiter in the transmitted data.

8. The apparatus of claim 7, wherein the data transmitted by the one of the plurality of data sending devices is scrambled, and further wherein:
    the one of the plurality of data requesting devices knows a scrambler state of the one of the plurality of data sending devices and a scrambler type, and further wherein the one of the plurality of data requesting devices uses the scrambler state and the scrambler type to descramble the data.

9. The apparatus of claim 1, further comprising at least one other low-latency digital programmable controller configured as at least one second central orchestrating unit coupled to the packet switch network device.

10. A data orchestration method, comprising:
    configuring each of a plurality of data requesting devices and a plurality of data sending devices with at least one request port and at least one response port;
    coupling a packet switched network device to at least the respective request ports of the plurality of data requesting devices and the plurality of data sending devices;
    configuring a low-latency digital programmable controller as a central orchestrating unit coupled to the packet switch network device; and
    coupling a circuit switched network device to the central orchestrating unit and to at least the respective response ports of the plurality of data requesting devices and the plurality of data sending devices,
    wherein the circuit switched network device is configured to:
        receive a data request from one of the plurality of data requesting devices for data from one of the plurality of data sending devices; and
        send the data request to the central orchestrating unit, and
    further wherein the central orchestrating unit is configured to:
        receive the data request from the packet switched network; and
        process the data request by dynamically reconfiguring the circuit switched network fabric to create a physical connection between the one of the plurality of data requesting devices and the one of the plurality of data sending devices.

11. The method of claim 10, wherein the central orchestrating unit is an ultra-low latency field programmable gate array or an application-specific integrated circuit.

12. The method of claim 10, wherein the packet switched network is an Ethernet switch.

13. The method of claim 10, wherein the data apparatus includes a request plane managed by the central orchestrating unit and a data response plane.

14. The method of claim 10, wherein the circuit switched network fabric is reconfigured based on predetermined configuration information representing the circuit switched network.

15. The method of claim 10, wherein the one of the plurality of data requesting devices for data from one of the plurality of data sending devices are mesosynchronized prior to the one of the plurality of data sending devices transmitting data to the one of the plurality of data requesting devices.

16. The method of claim 10, wherein the one of the plurality of data sending devices transmits a pattern of data with the requested data, and further wherein the pattern of data is known by the one of the plurality of data requesting devices in advance, and further wherein the one of the plurality of data requesting devices uses the pattern of data to identify a delimiter in the transmitted data.

17. The method of claim 16, wherein the data transmitted by the one of the plurality of data sending devices is scrambled, and further wherein:
   the one of the plurality of data requesting devices knows a scrambler state of the one of the plurality of data sending devices and a scrambler type, and further wherein the one of the plurality of data requesting devices uses the scrambler state and the scrambler type to descramble the data.

18. The method of claim 10, further comprising configuring at least one other low-latency digital programmable controller as at least one second central orchestrating unit coupled to the packet switch network device.

* * * * *